Sept. 25, 1962  L. W. GERMANY ET AL  3,055,975
FOCUSSING MEANS FOR TELEVISION CAMERAS AND
TELEVISION CAMERAS INCORPORATING THEM
Filed Dec. 23, 1957
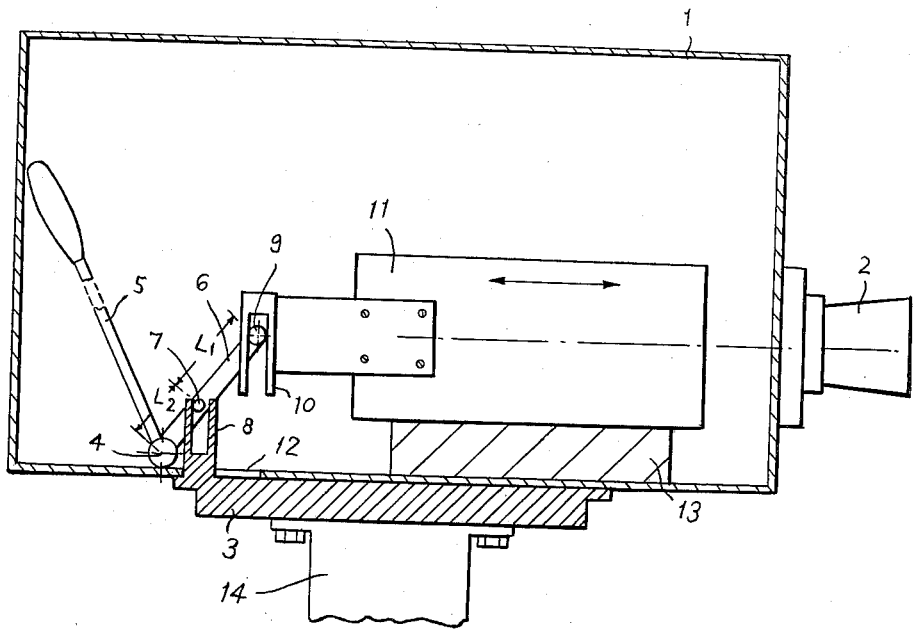
Inventors
Leslie W. Germany
John Kingsbury
By
Holcomb, Wetherill & Brisebois
Attorneys 3,055,975
Patented Sept. 25, 1962

3,055,975
FOCUSSING MEANS FOR TELEVISION CAMERAS AND TELEVISION CAMERAS INCORPORATING THEM
Leslie W. Germany and John Kingsbury, Cambridge, England, assignors to Pye Limited, Cambridge, England, a British company
Filed Dec. 23, 1957, Ser. No. 704,510
Claims priority, application Great Britain Jan. 8, 1957
8 Claims. (Cl. 178—7.2)

The present invention relates to television cameras and more particularly to means for counter-balancing the movement of the pick-up tube relatively to the body of a television camera during focussing.

In television cameras it is customary to control the focussing of the optical image on the pick-up tube screen by using fixed-focus lenses and moving the pick-up tube, associated deflection coils and ancillary equipment, hereinafter referred to as "the pick-up tube assembly," towards and away from the lens in use. Counterbalance weights are provided which are coupled to the pick-up tube assembly so as to move in a direction opposite to the movement of the pick-up tube assembly, in order to assist in balancing the camera on the stand or tripod on which it is supported and also to counterbalance the pick-up tube assembly itself against sliding under gravity upon the track along which it moves for focussing.

The present invention provides an arrangement for counterbalancing the movement of the pick-up tube assembly without requiring additional weilghts, whereby the total weight of the camera may be reduced.

According to the present invention the weight of the camera itself is utilised to counterbalance or offset the shifting of the centre of gravity of the camera due to the displacement of the pick-up tube assembly therein.

The present invention consists in a television camera having a camera body, a lens and a pick-up tube assembly, in which the lens is secured to the camera body and the pick-up tube assembly is movable relative thereto by a focussing control, wherein the operation of the focussing control causes the camera body and the lens on the one hand and the pick-up tube assembly on the other hand to move in opposite directions relative to the means for mounting the camera on its supporting stand, whereby the shifting of the centre of gravity of the camera due to the movement of the pick-up tube assembly therein is at least partially counterbalanced by opposite movement of the camera body and lens relative to the mounting means.

A feature of the invention consists in actuating the movement of the pick-up tube assembly and the camera body by means of a simple lever arrangement which is so designed, by taking advantage of the cosine law, that the sensitivity of the focus control is increased the nearer the pick-up tube assembly is to the lens.

In order that the invention may be more clearly understood, one embodiment thereof is diagrammatically illustrated in the accompanying drawing.

Referring to the drawing, 1 is the camera body having a lens 2 at its front end, which lens may be mounted in a known manner on a rotatable turret. The camera body 1 is mounted on mounting member or adaptor 3 by which the camera is adapted to be secured to a supporting stand 14. Whilst the adaptor 3 is secured against separation from the camera body 1, the adaptor and camera body are assembled together in such manner that the camera body can slide longitudinally relative to the adaptor. Appropriate guides are provided for constraining the camera to slide only in the longitudinal direction. Pivoted to the camera body at 4 is a focussing arm 5 which is disposed outside the camera body for manual operation. The pivot shaft 4 extends into the camera body and has a focussing lever 6 rigidly secured thereto. Spaced along the lever 6 there is provided a first pivot pin 7 which engages in the slot of a forked member 8 attached to the mounting adapter 3 and projecting into the camera body 1 through a slot 12 in the bottom thereof. At the free end of the lever 6 there is provided a second pivot pin 9 which engages in the slot of a second forked member 10 attached to the pick-up tube assembly 11 which is mounted on a track 13 for longitudinal sliding movement within the camera body towards and away from the lens 2. The two forked members 8, 10 are arranged with their slots extending in the direction at right angles to the direction of movement of the pick-up tube assembly within the camera body.

Thus when the focussing arm 5 is turned, both the pick-up tube assembly 11 and the camera body 1 are constrained to move in opposite longitudinal directions relative to the adaptor 3. When the focussing arm 5 is moved clockwise the pick-up tube assembly 11 will move to the right relative to the adaptor and the camera body 1 will move to the left relative to the adaptor. When the focussing lever 5 is moved anti-clockwise, the movements of the pick-up tube assembly and the camera body, will be reversed.

By appropriately determining the lengths $L_1$ and $L_2$ of the lever arm 6, the centre of gravity of the camera body 1 and the pick-up tube assembly together can be maintained substantially fixed relative to the adaptor and hence, if the camera is initially balanced on its support 14, it will remain so balanced. The weight of the camera body also counterbalances the pickup tube assembly against movement under gravity on its track when the camera is tilted on its stand.

The arrangement according to the invention is extremely simple and the change of weight due to changes of lenses in the lens turret will have relatively little effect on the balance of the camera. However, if desired, means may be provided for compensating for changes of weight due to different lenses being fitted to the turret. For example, means may be provided for adjusting the position of the first pivot pin 7, the overall length of the lever 6 remaining constant.

The movement of the focussing lever 6 effects the movement of the pick-up tube assembly in a non-linear manner such that, as the pick-up tube approaches nearer to the lens, the longitudinal movement of the pick-up tube assembly for a given angular movement of the focussing arm will, by reason of the cosine law, decrease. Consequently the sensitivity of the focussing control increases the nearer the pick-up tube approaches to the lens. This is of considerable advantage when short focal length lenses are used since with such lenses the variation in the image plane when focussing from "close-up" to infinity is very small and hence a greater angular movement of the focussing arm for a given change in distance between the lens and the pick-up tube assembly is desirable.

We claim:

1. A television camera comprising a camera body and restrained against movement along the light path of said lens, at least one lens secured to said camera body, a pick-up tube assembly, guide means supporting said pick-up tube assembly within said camera body for movement towards and away from said at least one lens, mounting means for movably mounting said camera body on a supporting stand so that said camera body can move relative to said mounting means, and focussing means for simultaneously moving said camera body and said pick-up tube assembly in opposite directions relative to said mounting means.

2. A television camera according to claim 1, wherein said focussing means includes a lever arrangement pivoted to said camera body and slidably coupled to said pick-up tube assembly and to said mounting means.

3. A television camera comprising a camera body and restrained against movement along the path of the lens, a lens secured to said camera body, a pick-up tube assembly, means for slidably mounting said pick-up tube assembly within said camera body for movement towards and away from said lens, a supporting stand, means for mounting said camera body for sliding movement on said supporting stand, a focussing control connected to said pick-up tube assembly for slidably moving said pick-up tube assembly towards and away from said lens, said focussing control also being connected to said camera body and to said supporting stand to simultaneously move said camera body and said pick-up tube assembly in opposite directions, to maintain the centre of gravity of said camera body and said pick-up tube assembly substantially stationary relative to said supporting stand.

4. A television camera comprising a camera body, a lens secured to said camera body and restrained against movement along the light path of the lens, a pick-up tube assembly, guide means supporting said pick-up tube assembly for longitudinal sliding movement within said camera body towards and away from said lens, mounting means for mounting said camera body for longitudinal sliding movement on a supporting stand along a path generally parallel to the path of movement of said pick-up tube assembly, a focussing control including a lever arrangement interconnecting said camera body, pick-up tube assembly, and mounting means, for moving said pick-up tube assembly towards and away from said lens while simultaneously moving said camera body in an opposite direction to said pick-up tube assembly relative to said mounting means, the shifting of the centre of gravity of said pick-up tube assembly being at least partially counterbalanced by the shifting of the centre of gravity of the camera body in said opposite direction relative to said mounting means.

5. A television camera according to claim 4, wherein said lever arrangement includes a lever arm connected adjacent one of its ends to the camera body by a pivot, the axis of which is at right angles to the direction of said longitudinal sliding movement, and adjacent its other end by first coupling means to said pick-up tube assembly, said mounting means being connected to said lever arm by second coupling means at a point intermediate the connections to said camera body and said pick-up tube assembly.

6. A television camera according to claim 5, wherein said first and second coupling means comprise first and second pins spaced along said lever arm and which engage in first and second slotted members on the pick-up tube assembly and mounting means respectively, the slots in said members extending perpendicular to the direction of said longitudinal sliding movement.

7. A television camera according to claim 6, wherein one of said pins is adjustable along said lever arm.

8. A television camera comprising a camera body, a lens secured on said camera body and restrained against movement along the light path of said lens, a pick-up tube assembly, means for mounting said pick-up tube assembly for longitudinal sliding movement within said camera body towards and away from said lens, a first slotted member secured on said pick-up tube assembly, the slot of which is disposed perpendicular to the direction of said longitudinal sliding omvement, a supporting stand, a mounting member, means for immovably securing said mounting member to said supporting stand and means for mounting said camera body on said mounting member for longitudinal sliding movement of the camera body on said mounting member, a slot parallel to the direction of said longitudinal sliding movement formed in the base of said camera casing and a second slotted member having a slot therein parallel to the slot in said first slotted member, said second slotted member projecting through the slot in the base of said camera casing into said camera casing, a pivot shaft, means for mounting said pivot shaft in said camera casing for rotation about an axis at right angles to the direction of said longitudinal sliding movement and perpendicular to the slots of said first and second slotted members, a focussing arm secured to said pivot shaft outside said camera casing and a lever arm secured adjacent one of its ends to said pivot shaft within said camera casing, a first pivot pin secured adjacent the free end of said lever arm and a second pivot pin secured to the lever arm between said pivot shaft and said first pivot pin, said first and second pivot pins engaging respectively in the slots in said first and second slotted members, said lever arm making with the direction of said longitudinal sliding movement an angle not exceeding 30° when said pick-up tube assembly is in its most forward position, closest to the lens, to which it can be moved.

References Cited in the file of this patent

UNITED STATES PATENTS

| 2,697,971 | Evans | Dec. 28, 1954 |
| 2,960,569 | Holman | Nov. 15, 1960 |

FOREIGN PATENTS

| 147,874 | Australia | Dec. 21, 1952 |

OTHER REFERENCES

Germany, Patent pending #F11515VIIIa/21a', Dec. 29, 1955 (pages 1–3 of spec.; 1 sht. drwg.).